United States Patent [19]
Bucalo

[11] 3,712,338
[45] Jan. 23, 1973

[54] ASSEMBLIES OF PRECISION-FITTED RELATIVELY MOVABLE COMPONENTS AND METHOD FOR MANUFACTURING THE SAME

[75] Inventor: Louis Bucalo, Holbrook, N.Y.

[73] Assignee: Kinemotive Corporation, Farmingdale, N.Y.

[22] Filed: Nov. 20, 1970

[21] Appl. No.: 91,497

Related U.S. Application Data

[62] Division of Ser. No. 826,992, May 22, 1969, Pat. No. 3,616,520.

[52] U.S. Cl. ............................137/625.41, 251/315
[51] Int. Cl. ..........................F16k 11/00, F16k 5/06
[58] Field of Search ...137/625.41; 117/107, 104, 74; 148/6.2

[56] References Cited

UNITED STATES PATENTS

| 208,808 | 10/1878 | Glenn | 137/625.41 |
| 2,083,228 | 6/1937 | Geyer | 137/625.41 X |
| 2,766,138 | 10/1956 | Talmey | 117/130 E |
| 2,854,027 | 9/1958 | Kaiser et al | 137/625.41 |
| 3,203,448 | 8/1965 | Jansen | 137/625.41 |
| 3,340,164 | 9/1967 | Zimmerman | 117/8 X |
| 3,363,650 | 1/1968 | Scaramucci | 251/214 X |
| 3,446,236 | 5/1969 | Waltien | 251/368 X |
| 3,489,603 | 1/1970 | Darter et al. | 117/49 X |
| 3,506,036 | 4/1970 | Hare | 251/368 X |
| 3,616,520 | 11/1971 | Bucalo | 117/107 |

*Primary Examiner*—Samuel Scott
*Attorney*—Steinberg and Blake

[57] ABSTRACT

An assembly of at least two precision-fitted components, wherein at least one of the components is movable relative to the other, and a method of manufacturing the assembly. One of the components is formed directly on the other by techniques already known in connection with deposition of molecular layers when forming coatings, linings, and the like. However, the materials are selected so that the deposited molecular layers do not adhere to the surface on which they are deposited, or are provided with a strippable coating. As a result the two components will have perfectly complementary surfaces providing a perfect precision fit. Thus, it becomes possible to provide between a pair of components, at least one of which is movable relative to the other, a perfectly precise fit.

12 Claims, 33 Drawing Figures

PATENTED JAN 23 1973 3,712,338

INVENTOR
LOUIS BUCALO

ATTORNEYS

INVENTOR
LOUIS BUCALO
ATTORNEYS

INVENTOR
LOUIS BUCALO

ASSEMBLIES OF PRECISION-FITTED RELATIVELY MOVABLE COMPONENTS AND METHOD FOR MANUFACTURING THE SAME

CROSS REFERENCE TO RELATED APPLICATION

This application is a division of application Ser. No. 826,992, filed May 22, 1969, and entitled "Assemblies of Precision-Fitted Relatively Movable Components and Method for Manufacturing the Same", now U.S. Pat. No. 3,616,520 issued Nov. 2, 1971.

BACKGROUND OF THE INVENTION

The present invention relates to devices such as valves, bearings, seals, actuators, motion-transmissions, and in fact to all assemblies wherein one components moves relative to another while having a precision fit with respect thereto, and to methods for manufacturing such assemblies.

At the present time, assemblies of this type which require an extremely precise fit between the components can only be manufactured by utilizing extremely expensive techniques. In many cases the costs involved are prohibitive, and even when dealing with assemblies where the high costs are justified, the precision of the fit cannot always be reliably maintained as close to perfection as desired.

For example, in the case of valves, there may be no particular problem in controlling the flow of a fluid such as a liquid of relatively high viscosity. However, when dealing with fluids such as helium, for example, the precise close fit which will reliably prevent leakage of the helium is impossible to achieve without resorting to extremely expensive structures and techniques. In the case of bearings, it is highly desirable in certain installations to provide air bearings of such small thickness that the clearance between rotary and stationary components provided with such a bearing is measured in millionths of an inch. Such bearings require extremely precise manufacturing techniques so as to be capable of achieving between such stationary and rotary components the required minute thickness in the air gap. The above problems in connection with valves are also present in connection with seals. For example, where a movable component is required to extend from the interior to the exterior of a housing through a wall thereof, it often is necessary to provide for such a movable component a seal which cannot effectively prevent leakage unless it has a precision which approaches perfection. In the case of actuators, such as those which respond to temperature changes, it is necessary to enclose between a pair of components, at least one of which is movable relative to the other, a thermally responsible medium which will expand and contract in response to temperature changes while at the same time displacing one of the components with respect to the other. With devices of this latter type it is extremely difficult to provide between the components the precise fit which will reliably maintain the thermally responsive medium enclosed without any possibility of leakage while at the same time retaining the required freedom of movement of one component with respect to the other in response to expansion and contraction of the thermally responsive medium.

It is not only in the fields of bearings, seals, valves, and actuators, that the requirements of precisely fitting components is encountered. For example, in the case of motion transmissions such requirements also are frequently encountered. For example, a motion transmission may take the form of a splined connection between a pair of components one of which is required to move axially with respect to the other while at the same time transmitting rotary movement thereto. With such assemblies it is almost impossible, as a practical matter, to eliminate any backlash in such a transmission. Nevertheless, the requirement of elimination of such backlash is often essential in devices such as machine tools where motion transmissions without inaccuracies induced by backlash may be of critical importance.

A special problem encountered in assemblies of this general type is present in components which are threaded to each other. It is virtually impossible at the present time to provide threaded surfaces which coact with each other in a perfectly precise manner. Even when the threads are manufactured on the best possible machines by the most skilled personnel with the best possible techniques, there will still be binding between the threads and failure of one component to turn freely on the thread of the other component unless a sacrifice is made in the quality of the precision with which the parts fit together. In other words at the present time there is necessarily a lack in the precision of mating threads in order to guarantee that one threaded component will move on the threads of the other component.

Furthermore, considerable problems are encountered in maintaining the required precision fit between components throughout a long operating life. Where one component moves relative to another there is an unavoidable wear therebetween which eventually will cause the precision in the fit between the components to deteriorate. Naturally, it is possible to choose for such components hard-wearing materials which will have a long operating life, but such materials are usually extremely expensive so that when manufacturing assemblies which as a practical matter can only be sold at a relatively low cost, it becomes difficult to achieve a precision fit which will have a long operating life.

It has already been attempted to achieve a precision fit by casting one component upon another. For example, in the case of bearings, ball-and-socket joints, and the like, there have been proposals to cast a molten material which forms one of the components directly on the other component. However, these techniques have not proved to be satisfactory in practice. The molten material solidifies in a completely uncontrollable manner so that the extent to which it shrinks during solidification is a random, haphazard factor preventing the achievement of a high degree of precision. Furthermore, a great limitation on such techniques resides in the fact that the components must have widely different melting points so that one of the components will be able to remain in solid, non-molten condition, while engaged by the other component which initially is in a molten condition. Therefore, when it becomes necessary to deal with molten materials, the conditions encountered effectively prevent achievement of any high degree of precision in the fit between components.

SUMMARY OF THE INVENTION

It is accordingly a primary object of the present invention to provide an article and method which will avoid all of the above drawbacks.

In particular it is an object of the invention to provide an article which can be manufactured at a relatively low cost, so that the article is relatively inexpensive, while at the same time an extremely high degree of precision is maintained between a pair of components at least one of which is movable relative to the other.

It is a particular object of the present invention to provide articles such as valves, seals, bearings, actuators motion-transmissions, threaded components, and the like, with a fit between the components of such devices which has a precision which heretofore could not be achieved, while at the same time maintaining the costs of such assemblies relatively low.

In particular, it is an object of the invention to provide a method for manufacturing such devices at extremely low costs while achieving for the structure a high quality precision in the fit, as referred to above.

Furthermore, it is an object of the invention to provide devices of the above general type with a structure which will automatically compensate for any wear between the components, so that even if they are made of relatively inexpensive materials which show signs of wear in a relatively short time, nevertheless the required precision in the fit can still be maintained.

According to the invention, one of the components is formed directly on the other so that the two components will have perfectly complementary surfaces where movement is required of at least one component relative to the other. The techniques used in forming one component on the other is a technique which involves the deposition of a molecular layer of material simultaneously over the entire surface which is to be complementary to a surface of the component formed by such deposition. These molecular layers are deposited one upon the other so as to build up to the required thickness, and in this way the several molecular layers form an integrated unitary construction which has an extremely precise fit with respect to the components on which the layers were deposited. While such techniques are indeed already known in connection with deposition of coatings, linings, and the like, the present invention distinguishes fundamentally over such known techniques in that the materials used are chosen so that they will not adhere or may include strippable coatings. Thus the deposited component, because its materials does not adhere to the surface of the component on which the layers are deposited, forms with the latter component an assembly wherein at least one of these components is movable relative to the other.

The invention is illustrated by way of example in the accompanying drawings which form part of this application and in which.

Figure 1A:
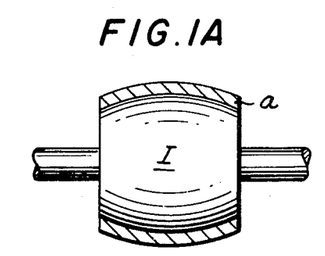
FIGS. 1A and 1B are respectively schematic, partly sectional, longitudinal and end views illustrating an early stage during the progress of a method of the present invention when manufacturing an assembly of the present invention.
Figure 1B:
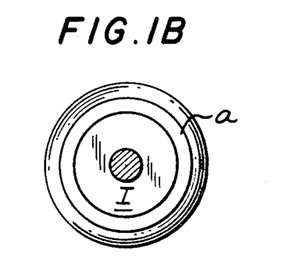

Referring first to FIGS. 1A and 1B, there is illustrated therein an inner component I which may have any configuration consistent with a desired relative movement of one component with respect to another. In the illustrated example there is shown, simply for purposes of illustration and for no other reason, a component I which forms part of a solid ellipse having a pair of flat end surfaces from which coaxial shafts extend, as schematically illustrated.

As is schematically illustrated in FIGS. 1A and 1B, there is deposited on the exterior convexly curved surface of the component I a molecular layer $a$. This layer $a$ is to be understood as having a thickness of one molecule. It is of course illustrated at a much greater thickness, since otherwise it would be impossible to illustrate this initial molecular layer $a$ which is deposited on the exterior, convexly curved surface of the component I. This molecular layer $a$ is simultaneously deposited over the entire area of the exterior convex surface of the body or component I. The deposition of such a molecular layer may be brought about by techniques such as electrolytic deposition, catalytic deposition, or gas plating.

According to the invention the material of the molecular layer $a$ will not adhere to the surface of the component I. For example, this component I may be made of stainless steel while the molecular layer $a$ may be made of nickel. As another example, the molecular $a$ may be made of copper while the component I is made of a suitable plastic. There are many other materials available which can be selected in such a way that the deposited layer will not adhere to the surface on which it is deposited.

It is to be noted that this deposited layer $a$ is not derived from a metal which is in a molten condition. Even in the case of gas plating the metal which is deposited is initially in the form of a compound such as halide which is acted upon in a well-known manner so as to form a molecular layer on the surface on which the metal is deposited.

Figure 2A:
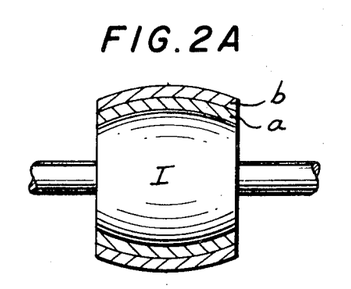
FIGS. 2A and 2B are respectively schematic, partly sectional axial and end views showing the method and structure of FIGS. 1A and 1B at a point in the method subsequent to the instant illustrated in FIGS. 1A and 1B.
Figure 2B:
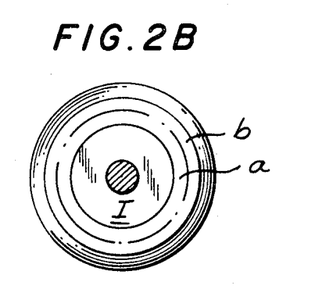

Referring now to FIGS. 2A and 2B, there is illustrated therein a second molecular $b$ which is deposited upon and surrounds the layer $a$. Thus, at a given extremely small increment of time after the layer $a$ is deposited, the layer $b$ will be simultaneously deposited all over the exterior surface of the layer $a$, and of course the layer $b$ will be integral with the layer $a$, to form a unitary structure therewith. It is for this reason that the demarcation between the layers $a$ and $b$ is illustrated with a dot-dash line in FIG. 2B.

Figure 3A:
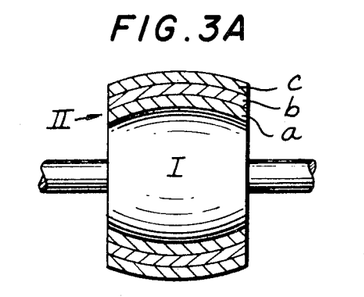
FIGS. 3A and 3B are respectively schematic, partly sectional longitudinal and end views illustrating a stage in the method which is subsequent to that of FIGS. 2A and 2B.
Figure 3B:
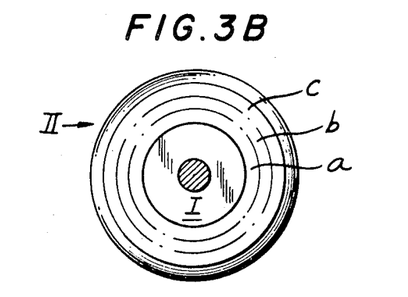

In FIGS. 3A and 3B, there is a schematic illustration of the deposition of a third molecular layer $c$ on the molecular layer $b$, and of course in this case also the third layer $c$ is simultaneously deposited over the entire exterior surface of the layer $b$ and becomes integrally united thereto. In this way it is possible to build on the inner component I an outer component II which will have a preselected thickness, according to the rate of deposition and length of time that the layers are successively deposited one upon the other to form the outer component II which has all of the molecular layers integrated to form a unitary body in the illustrated example. Because the materials of the components I and II will not adhere to each other these components are free to move one with respect to the other. Moreover, because the outer component II is formed directly on the component I, there is a perfect precision at the complementary surfaces of these components which engage each other at their interface.

The above-described technique or method of the invention can be used to manufacture, with further features of the method of the invention, described below, various assemblies which have extremely precise fit where on component is movable relative to the other.

Figure 4:
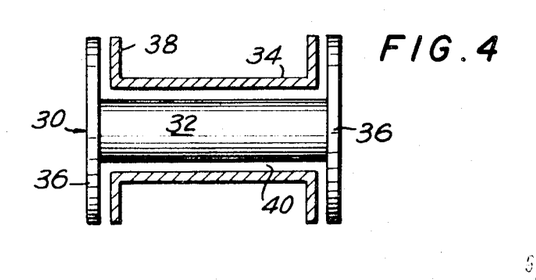
FIG. 4 is a partly sectional schematic axial elevation illustrating an air bearing of the invention manufactured according to the method of the invention.

Thus, in the case of FIG. 4, there is a schematic illustration of an assembly 30 of the invention. This assembly 30 includes an inner component 32 and an outer component 34. The inner component 32 is in the form of a cylinder having a pair of end flanges 36. The outer component 34 is in the form of an outer cylinder surrounding the inner cylinder 32 and also having a pair of end flanges 38. Between the components 32 and 34 of the assembly 30 there is an air-gap which is of a uniform thickness throughout. This thickness may be on the order of less than ten-millionths of an inch, for example. Thus, the air gap 40 can be filled with air bearing permitting one of the components 32 and 34 to rotate at relatively high speed with respect to the other of the components around the common axis of these components. The use of such air bearings is of the utmost importance in many applications, such as in the textile industry, in gyroscopes, etc., where parts are required to rotate at such high speeds that conventional bearings with conventional lubrication cannot be used.

In order to achieve the construction of the assembly 30 shown in FIG. 4 and described above, molecular layers are deposited on the components 32 in the manner set forth above in connection with FIGS. 1A–3B. However, the initially deposited layers are made of one material, while the succeeding layers are made of a second material which will form the component 34. The initially deposited layers are made of a material which can be removed from the material used for the component 34 as well as from the component 32. For example, depending upon the materials used for the component 32 and 34, the initially deposited layers can be made of tin, lead, or any material which in response to the action of heat, attack by a suitable caustic, or the like, will be removable from between the component 32 and the component 34 so as to define the air gap 40. Therefore, by initially depositing layers which conform to the configuration of the air gap 40 and then depositing layers of a different material which will conform to the configuration of the component 34, it becomes possible to eliminate the intermediate, initially deposited layers to define the air gap 40. Because it is possible, by well-known techniques, to control the thickness of the deposited layers, so that the thickness of the initially deposited layers can be controlled to within millionths of an inch, it is possible in this way to achieve for the air gap 40 a uniform thickness on the order of a relatively small number of millionths of an inch.

It is to be emphasized that this result is achieved even though there may be inherent inaccuracies in the component 32 on which the depositions are made. Thus, for example, the component 32 may be constructed within an inaccuracy of a few thousandths of an inch. As long as it is not out of round to an extent greater than the thickness of the air gap 40, whether the diameter of the inner component 32 is a few thousandths greater or less than a preselected magnitude will be immaterial, because the outer component is formed directly on the inner component and cannot fail to have a precise fit with respect thereto.

Figure 5:
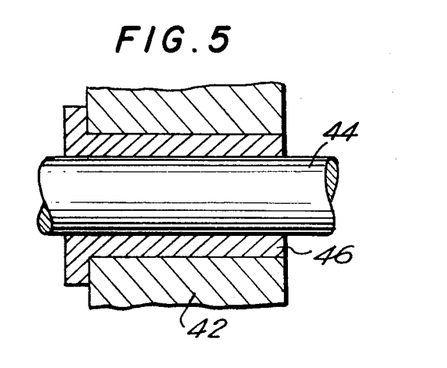
FIG. 5 is a fragmentary sectional elevation illustrating the invention as applied to a seal for a movable component.

Referring to FIG. 5, there is schematically represented therein a portion 42 of a housing in which any fluid is to be retained. On the other hand, a movable component 44 is required to extend in a fluid-tight manner from the interior to the exterior of the housing. In the simple example illustrated in FIG. 5 the movable component 44 may be considered as a shaft which is perfectly circular in cross section and which rotates about its axis. In accordance with the invention, there is deposited directly on the exterior surface of the shaft 44 a sleeve 46 which is mounted in an opening in the wall 42 of the housing. This sleeve 46 is deposited directly on the shaft 44 in a manner described above so that it is in the form of an integrated series of molecular layers deposited one upon the other directly surrounding the shaft 44 but not adhering thereto. As a result during rotary movement of the shaft 44 with respect to the sleeve 46, the extremely precise fit between these components will prevent any possible leakage of fluid. Of course, the same results can be achieved not only with rotary movement of the shaft 44 but also with axial movement thereof or with a combination of axial and rotary movement.

Figure 6:
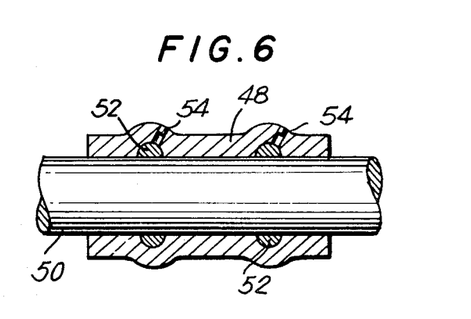
FIG. 6 is a schematic section elevation showing another embodiment of an assembly of components according to the invention.

FIG. 6 shows a variation of the structure of FIG. 5 according to which it is possible to provide the sleeve which surrounds the shaft with internal grooves. Thus, as may be seen from FIG. 6 a sleeve 48 corresponding to the sleeve 46 is deposited on a shaft 50 which corresponds to the shaft 44. However, before this sleeve 48 is deposited rings 52 are placed on the shaft 50 surrounding the latter. These rings may be made, for example, of a metal of low melting point such as lead, tin, or the like, or the rings 52 may be made of any desired plastic of relatively low melting point. Thus, when the sleeve 48 is deposited on the shaft 50 it will conform to the configuration of the rings 52 as well as to the configuration of the exterior surface of the shaft 40, and thus the rings 52 may be considered as determining part of the configuration of the complementary surface of the component 50, 52 on which the component 48 is deposited. After deposition of the component 48 is terminated, it is possible to drill one or more holes 54 from the exterior surface of the sleeve 48 up to the rings 52. Then with the application of heat the material of these rings can be melted so as to flow out through the holes 54, thus leaving annular grooves in the ring 48 surrounding the shaft 50. If desired, depending upon the nature of the assembly, the sleeve 48 can be slipped off the shaft 50 after the sleeve 48 is formed, and then access may be had to the interior of the sleeve 48 for removing the rings 52. Then the sleeve 48 can be replaced on the shaft 50 and it can be mounted with a press fit, for example, in the wall of a housing such as the wall 42 shown in FIG. 5. For many purposes it is often desirable to have such grooves in a sleeve. For example, if a fluid such as a liquid should happen to leak along the interface between the sleeve 48 and the shaft 50, the fluid can collect in these grooves. Moreover, it is possible to situate in such grooves any desired sealant in the event that such an additional sealant is considered desirable for particular installations.

Figure 7A:
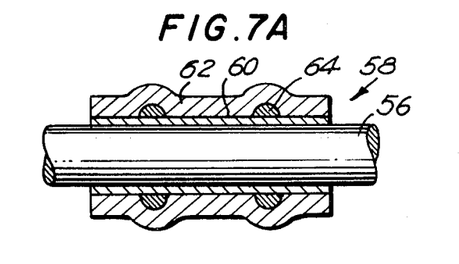
FIG. 7A illustrates a preliminary stage in the manufacture of an assembly where the components will have a predetermined clearance while at the same time achieving an effective seal at the clearance therebetween.
Figure 7B:
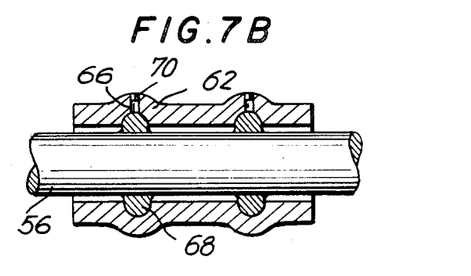
FIG. 7B shows in a schematic sectional elevation an assembly which may be manufactured in the manner illustrated in FIG. 7A.

It is often highly desirable to be able to provide a seal of extremely small friction, and FIGS. 7A and 7B illustrate how it is possible to achieve this result with the present invention. Thus, referring to FIG. 7A, there is illustrated therein a shaft 56 which may be a simple rotary shaft, for example. The outer component 58 which is deposited in accordance with the invention on the shaft 56 includes a series of initially deposited molecular layers 60 the nature of which is that the initially deposited layers can be removed; in much the same way as described above in connection with the air bearing of FIG. 4. The components 58 thus includes a series of deposited molecular layers made of a second material and forming the outer portion 62 of the component 58. However, in this case before the second material which forms the portion 62 of component 58 is deposited, rings 64 are placed around the initially deposited layers which form the inner portion 60 of component 58. These rings 64 correspond to the rings 54 of FIG. 6 in that they may be removeable subsequent to the deposition of the second material which forms the part 62 of component 58. Thus, according to the method shown in FIG. 7A, the layers which form part 60 are initially deposited, then the rings 64 are provided, and then the layers which form the part 62 of the outer component are deposited.

After these operations are completed the entire component 58 may be removed from the shaft 56 and through the application of heat or a suitable caustic solution or the like it is possible to remove the inner portion 60 and the rings 64 thus leaving the outer portion 62 of the component 58. This portion 62 may be mounted in any suitable support and surrounds the shaft 56 with a clearance the thickness of which is determined by the thickness of the removed part 60. The part 62 may be provided with bores 66 communicating with the grooves which result from the removal of the rings 64, and through these bores 66 it is possible to inject into these grooves a material such as mercury. In this way mercury rings 68 can be situated in the grooves formed upon removal of the material 64, and the small thickness of the gap resulting from removal of the inner part 60, which may be on the order of a small number of millionths of an inch, as pointed out above in connection with FIG. 4, will enable the mercury rings 68 to extend across this gap into engagement with the exterior surface of the shaft 56.

After the mercury 68 is thus introduced into the assembly the bores 66 can be plugged with suitable plugs 70. Thus, as may be seen from FIG. 7B, the mercury rings 68 are the only elements which will directly engage the shaft 56 so as to provide the required seal while at the same time the shaft 56 rotates with an extremely small friction within the surrounding sleeve 62. The nature of mercury is such that it is extremely cohesive and has an extremely high surface tension enabling this metal in liquid form to maintain its annular configuration surrounding the shaft 56 to provide the required seal of extremely low friction.

Figure 8:
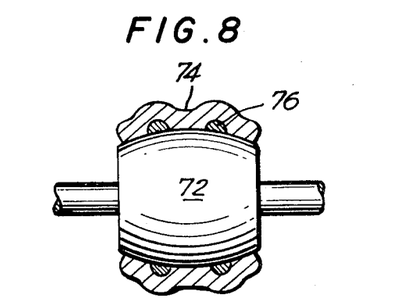
FIG. 8 is a sectional schematic elevation of an embodiment of the invention which includes sealing rings.

As has been pointed out above, in order to achieve a long operating life for the assembly of the invention, the components which frictionally engage each other should be made of hard-wearing materials which are relatively expensive. In order to reduce the costs it is possible to utilize an arrangement as shown in FIG. 8 according to which the inner component 72, corresponding to the component I of FIGS. 1A–3B, is an inexpensive plastic body and has deposited thereon the outer component 74, which is made up of an integrated series of molecular layers as described above. However, in this case the body 72 is initially surrounded by a pair of plastic rings 76. These rings may be made of a plastic which has a sliding, non-adherent engagement with the exterior surface of the inner component 72 so that through this expedient, the deposition of the outer component 74 directly on the inner component 72, 76 will include in the assembly the plastic portions 76 to provide a construction which is relatively inexpensive.

Figure 9:
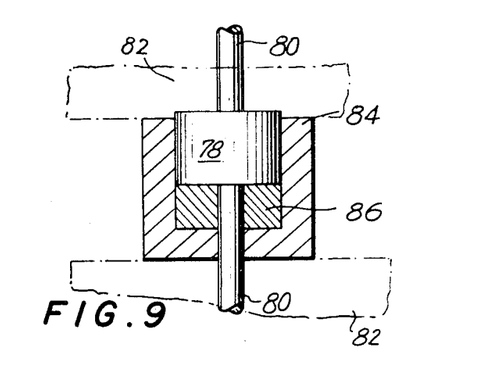
FIG. 9 is a schematic axial section illustrating the invention as applied to an actuator.

FIGS. 4–8 illustrate the application of the invention to bearings and seals. FIG. 9 is a schematic representation of the manner in which the invention can be applied to an actuator. The illustrated actuator includes an inner piston 78 made of a metal such as stainless steel and having coaxial shafts 80 fixed to and projecting from the opposed end faces of the piston 78. Next to the lower end of the piston 78, as viewed in FIG. 9, there is placed a body 86 of wax in solidified condition. With this body 86 of wax thus situated directly next to the piston 78, this piston 78 together with the body wax 86 are machined in common so that the was body 86 will form an extremely precise continuation of the piston 78 with the bodies 78 and 86 forming, very precisely, part of a common cylinder. Then, as indicated in dot-dash lines in FIG. 9, masking bodies 82 are placed around the shafts 80, with one of these bodies situated next to the piston 78 and with the other of the bodies spaced at a given distance from the wax 86. These insulating bodies 82 may be made of a suitable wax, for example. The exterior surface of the wax body 86 has in the meantime been rendered electrically conductive, in any suitable way as by having a coating of graphite deposited thereon. Now the outer component 84 is deposited by way of a series of molecular layers around the assembly 78, 86, between the masking bodies 82, so that in this way the outer component 84 is very precisely formed at its engagement with the piston 78 and body of wax 86. It is to be noted that the top end of the piston 78, as viewed in FIG. 9, will be exposed. When the desired thickness of the outer component 84 is reached, the deposition thereof is terminated and the wax masking bodies 82 are removed. With this construction, the material used for the body 86 is such that it responds to relatively high temperatures to expand to a relatively large extent so as to displace the piston 78. As a result it becomes possible to place the actuator in an assembly where it will respond to a given temperature rise for actuating the piston 78 so as to move the latter and the rods 80, while at the same time when the body 86 cools the piston 78 will be retracted due to the contraction of the body 86, as is well-known. The lower shaft 80 of FIG. 9 slides very precisely through the end wall of the deposited outer component 84 while the piston 78 slides very precisely within the component 84. Thus, the invention makes it possible to fill the interior space in the component 84 which is not occupied by the piston 78 to an extent which cannot be matched with other actuators of this type without resorting to complex evacuating and plugging devices and the like, while at the same time there is absolutely no inconvenience in connection with filling of the interior of the outer component 84 in an absolutely complete manner with the body 86 and the piston 78.

Figure 10:
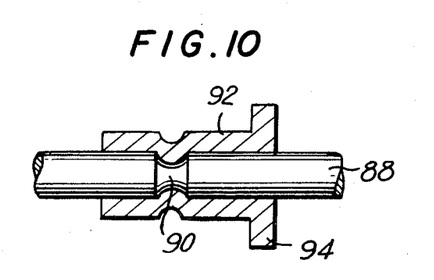
FIG. 10 is a schematic sectional elevation illustrating how parts can be interconnected according to the invention in a manner preventing axial movement but permitting circumferential, rotary movement therebetween.

In the event that it is desired to provide for a rotary shaft a structure which will prevent axial movement thereof, an assembly as shown in FIG. 10 may be provided. With this construction the shaft 88 is formed with an annular groove 90. The situation of the portion 96 of the deposited sleeve 92 in the groove 90 prevents an axial movement of the shaft 88 with respect to the sleeve 92. In the case of FIG. 10, as it true also of the case of FIG. 9, the outer component may be made, for example, of nickel, while the inner component may be made of stainless steel. Furthermore, instead of providing an arrangement as shown in FIG. 10, it is possible to provide the shaft 88 with an outwardly bulging circumferential rib received in a corresponding groove formed at the inner surface of the outer sleeve which is deposited thereon. Such an arrangement will also prevent axial movement of a rotary component with respect to a sleeve in which it is located. Moreover, with an arrangement as shown in FIG. 8 it is possible to situate the sealing rings in grooves formed at the exterior of the inner component 72 for a slidable engagement with the inner surface of the outer component 74. Such reversals will not in any way influence the operation of the structure of the invention.

Special problems are encountered in connection with assemblies where the components respectively have threaded surfaces in engagement with each other. In the case where a shaft has a thread machined on its exterior surface and a surrounding annular body has a corresponding thread machined on its interior surface, no matter how accurately these threads are machined there nevertheless will be a lack of a truly high degree of precision in the coaction between the threaded surfaces. Moreover, when only one thread is provided as at the exterior surface of a shaft and the outer component is deposited on such a thread, it has been found in practice that it is impossible to machine the thread with a perfection which will enable such a deposited outer component to turn on the thread even though the material used for the molecular layers of the outer component does not adhere to the material used for the inner threaded member. In other words, assuming that the thread is manufactured by an operator of the greatest skill on the best possible and most precise operating machine tool, nevertheless it is not possible to achieve a thread of such uniform axial and circumferential dimensions that a component deposited thereon in the form of molecular layers, as described above, can turn freely on such a thread even though the outer component does not adhere to the inner component. Binding between these components is inevitable under these conditions, as has been learned from actual experience.

Figure 11A:
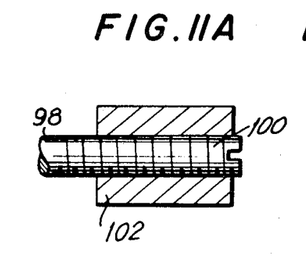
FIG. 11A illustrates in a schematic sectional elevation a preliminary stage in the manufacture of threaded components according to the invention.
Figure 11B:
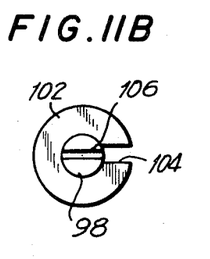
FIG. 11B is an end view of the assembly of FIG. 11A, as seen from the right end thereof.
Figure 11C:
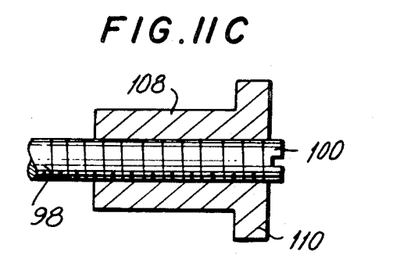
FIG. 11C is a schematic sectional elevation showing the final construction of an assembly manufactured according to the method illustrated in FIGS. 11A and 11B.

FIGS. 11A and 11B illustrate a method according to the invention for solving the problem of providing true precision in the fit between threaded components, and FIG. 11C illustrates an assembly resulting from the method of FIGS. 11A and 11B. Referring to FIG. 11A, a shaft 98 is illustrated therein. This shaft is formed with a thread 100, and this thread is formed as perfectly as possible, although there will be limitations on the degree to which the thread can be manufactured with precisely uniform circumferential and axial dimensions. This threaded component 98 forms an inner component on which an outer component 102 is deposited according to the method of the invention. Thus, the outer component 102 is built up from molecular layers deposited one upon the other so as to become integrated and made of a material which does not adhere to the material used for the shaft 98. Before the outer component 102 is deposited, a rib of nonconducting wax is placed against the exterior surface of the shaft 98 extending axially there-along, so that after the component 102 is deposited this rib can be readily removed to provide the construction shown most clearly in FIG. 11B. Referring to FIG. 11B it will be seen that the outer component 102 is provided with an axial slot 104 resulting from removal of the rib of wax attached to the exterior surface of the shaft 98 in any desired manner so that the deposited sleeve 102 is circumferentially interrupted to form the elongated gap 104 extending along the entire length of the sleeve 102, as indicated in FIG. 11B. The end of the shaft 98 visible in FIG. 11B may be provided with a transverse groove 104 to receive the tip of a screw driver, for example.

As has been indicated above, the deposited sleeve 102 will bind on the threads 100 although the inner surface of the deposited outer component 102 will conform precisely to the threads 100. Irrespective of the accuracy with which these threads are formed binding will be unavoidable upon turning of components 98 and 102 one with respect to the other. However, because of the presence of the slot 104 it is possible for the outer sleeve 102 to spring circumferentially, so that the member 102 can be turned off from the shaft 98. After the components 98 and 102 are separated from each other, a lapping compound is placed on the threads 100 and the sleeve 102 is returned so that the lapping compound becomes situated at the interface between the threaded surfaces. These surfaces are rotated one with respect to the other with the lapping or grinding compound therebetween until the outer component 102 can turn freely on the inner component, and the result is that the inaccuracies necessarily inherent in the thread 100 when it was originally manufactured are eliminated and a thread of perfect circumferential and axial dimensions is achieved in this way.

Then the outer component 102 is removed, and after the threaded surface of the shaft 98 has been suitably cleaned and passivated, if required or desired, an outer component 108 is deposited on the shaft 98 so that the inner surface of this component 108 will conform precisely to the threads 100. However, in this case, because of the lap grinding of the threaded surface 100, the deposited outer component 108 can turn on the thread 100, so that in this way it becomes possible to achieve threaded surfaces which have a fit of a precision which heretofore could not be attained. The deposited outer component 108 may, if desired, be provided with a flange 110.

Figure 12A:
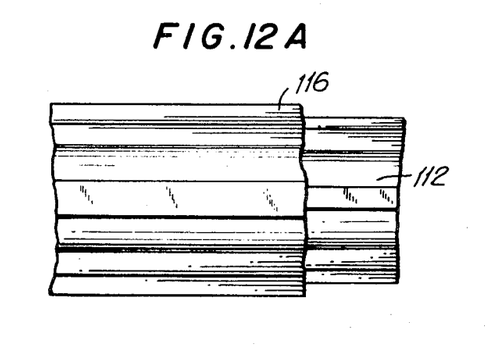
FIGS. 12A and 12B are respectively schematic sectional longitudinal and transverse views of a motion transmission of the invention, in the form of a splined connection, constructed according to the method of the invention.
Figure 12B:
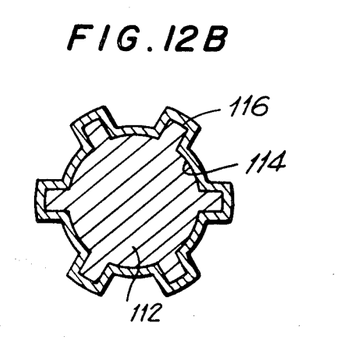

FIGS. 12A and 12B show an assembly according to the invention where the inner component 112 is in the form of an elongated shaft formed with axial grooves 114 uniformly distributed about its axis. The outer component 116 is deposited on this shaft so as to conform precisely to the configuration of the exterior surface thereof, and this outer component 116 is, in accordance with the invention, built up from a series of integrated molecular layers of a material which does not adhere to the shaft 112. As a result of this method and assembly of the invention a splined connection is provided between the inner component 112 and the outer component 116, and while these components can move axially one with respect to the other, nevertheless they cannot move circumferentially or angularly one with respect to the other. The great advantage which is achieved with the method and assembly of FIGS. 12A and 12B is that in the transmission of rotary movement between these components there is no possibility of backlash. In other words the precision of the fit between the components 112 and 116 is of such a high quality that there is absolutely no possibility of any angular play between these components during transmission of rotary motion therebetween. As a result it becomes possible to incorporate an assembly as shown in FIGS. 12A and 12B in any structures which require the most precise transmission of angular motion without any possibility of backlash in the transmission.

Figure 13:
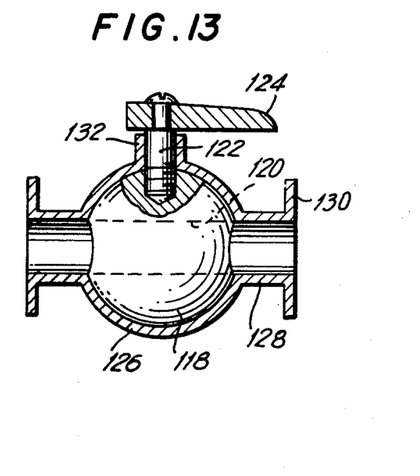
FIG. 13 is a sectional elevation illustrating a ball valve of the invention.

FIG. 13 illustrates a valve of the invention constructed according to the method of the invention. This valve is a ball valve having an inner component 118 in the form of a steel body of spherical configuration as illustrated. This inner valve component 118 is formed with a throughflow bore 120 and with a tapped bore into which an operating stem 122 is threaded. The outer end of the stem 122 has a non-circular portion receiving the handle 124.

The inner component 118 is surrounded by the outer component 126 made of copper, for example, so that it does not adhere to the steel of the inner component. This outer component 126 is deposited in accordance with the invention directly on the component 118 to form the series of integrated molecular layers, and because of the precision in the fit between the components 118 and 126 resulting from the deposition of the latter directly on the component 118, an absolute assurance of fluid-tightness at the interface between these components is achieved. The outer component 126 is formed with coaxial tubular extensions 128 which may terminate in integral flanges 130 to enable the valve to be connected into any circuit where a fluid flows. The outer component 126 also has a cylindrical extension 132 fluid-tightly surrounding the rotary stem 122. The valve of FIG. 13 is shown in its open position where the throughflow bore 120 is coaxial with the tubular portions 128 of the outer component 126. As is well-known it is possible to turn the handle 124 so as to rotate the inner valve component 118 about the axis of the stem 122 so as to turn the valve toward a closed position where the bore 120 is out of alignment with the coaxial tubular extensions 128.

Figure 14:
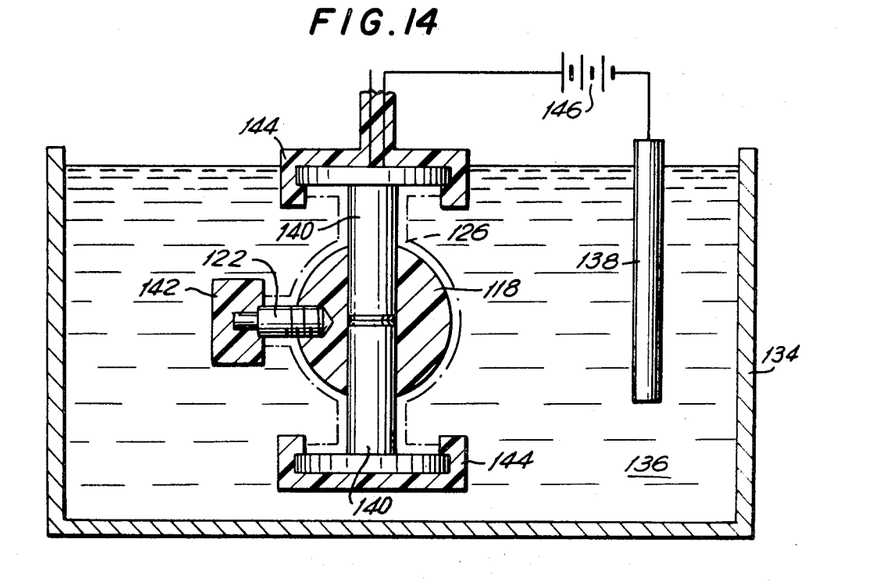
FIG. 14 is a schematic representation of a method of the invention for manufacturing the ball valve of FIG. 13.

The valve of FIG. 13 may be manufactured according to the method of the invention which is schematically illustrated in FIG. 14. Thus, referring to FIG. 14, there is schematically represented therein a vat or tank 134 which contains a solution 136 of nickel sulfate, for example. Within this solution is located an electrode 138 of nickel to replenish the nickel which is extracted from the electrolytic solution 136. The stainless steel valve body 118 has its bore 120 filled with a pair of studs 140 also made of stainless steel and having a tight snug fit in the throughflow bore 120. The stem 122 is threaded into the tapped bore of the valve body 118. The outer end of the stem 122 is covered by a body 142 of a masking plastic while the outer enlarged circular ends of the studs 140 are also covered by any suitable masking bodies 144 made, for example, of plastic material. A source of current 146 is connected, as shown schematically in FIG. 14, through suitable conductors on the one hand to the electrode 138 and on the other hand to one of the studs 140. Because the plastic masking bodies 142 and 144 are not electrically conductive, the metal extracted from the electrolytic solution will not become deposited upon these masking bodies 142 and 144. Instead the electrolytic deposition will take the form shown in dot-dash lines in FIG. 14 to provide in this way the outer component 126 the configuration of which will conform to that illustrated in FIG. 13. Although in FIG. 14 an electrolytic deposition of nickel on steel is illustrated, it is of course equally possible to provide an electrolytic deposition of copper. When the integrated molecular layers which are deposited one upon the other to form the outer component 126 have built up to a predetermined desired thickness, the operations in connection with the electrolytic deposition are terminated and the assembly shown in FIG. 14 is removed from the solution. The pair of stainless steel studs 140 are simply pulled out of the tubular extensions 128 to leave the inner component 118 surrounded by the outer component 126 in the manner described above in connection with FIG. 13. Upon removal of the masking body 142 the handle 124 is attached to the stem 122, and in this way the valve of the invention is completed.

Figure 15:
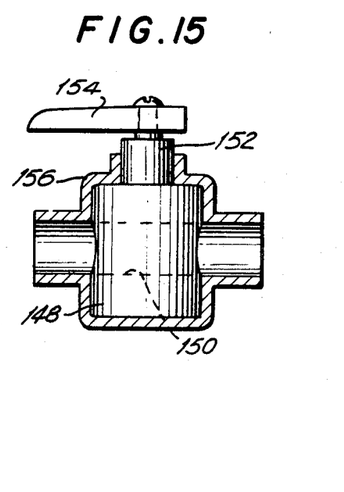
FIG. 15 shows a valve of a construction somewhat different from that of FIG. 13.

For many purposes it is desirable to have an inner rotary valve member which is of a cylindrical rather than a spherical configuration, and FIG. 15 shows such a construction. Thus, referring to FIG. 15 it will be seen that the valve illustrated therein includes an inner rotary component 148 of substantially cylindrical configuration, formed with a throughbore 150, having a stem 152 connected to an operating handle 154. The outer component 156 is deposited directly on the inner component 148 in the manner described above in connection with FIG. 13 and 14, so that all of the outstanding results of the invention can be achieved with the embodiment of FIG. 15 also.

It is to be noted in connection with FIGS. 13–15, that it is not essential that the inner component be made of an electrically conductive metal. For example, the inner component may be made of a plastic which is not electrically conductive. In this case it is possible to render the exterior surface of the inner component electrically conductive. For example, a layer of graphite may be placed on the exterior surface of such a component which is not electrically conductive, and then the electrolytic deposition will take place in the manner described above.

Figure 16:
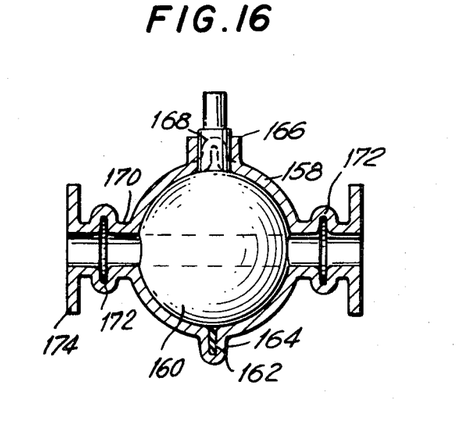
FIG. 16 illustrates a ball valve of the invention constructed according to the method of the invention, and capable of automatically compensating for wear as well as for changes in the conditions of the atmosphere in which the valve is located.

FIG. 16 shows a valve of the invention where an outer component 158 is deposited upon an inner component 160 in the manner described above in connection with FIGS. 13 and 14. However, in this case the inner component first has a ring 162 extending around the component 160 in a plane normal to that of FIG. 16, so that the outer deposited component 158 will have an annular convolution 164 extending around the outer component from one side to the other side of the cylindrical extension 166 which surrounds the stem 168. This ring 162 situated within the convolution 164 may be made of rubber or a similar sealing material (made conductive) to enhance the seal between the inner and outer valve components.

In addition, the removable studs 140 (FIG. 14) around which the tubular extensions 170 become deposited are surrounded by rings of wax or the like so that the outer component will have annular convolutions, 172. After the studs 140 are removed these wax rings are eliminated from within the convolutions 172 so that they will form the hollow springy structure illustrated in FIG. 16. It thus becomes possible to attach the end flanges 174 to any suitable supporting structure in such a way that the extensions 170 can expand and contract at the convolutions 172.

Figure 17:
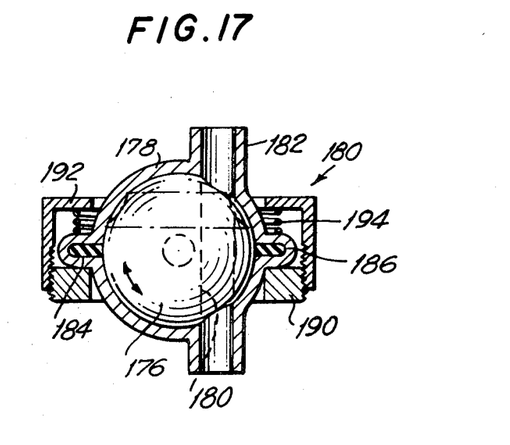
FIG. 17 is a schematic sectional elevation of a valve provided with a spring-actuated structure for wear compensation.

In the embodiment of the invention which is illustrated in FIG. 17, there is also a ball valve having an inner spherical component 176 on which the outer component 178 is deposited according to the method of the invention. However, in this case the throughflow bore 180 is displaced from a diameter of the spherical inner component 176. An operating stem is connected to this component at its side which is not visible in FIG. 17. Thus it becomes possible to turn the inner valve member 176 between the position shown in FIG. 17 where the bore 180 is in alignment with the tubular extensions 182 of the outer component 178 and a position displaced 90° from that of FIG. 17 where the bore 180 has the dot-dash line position, and this is a shut off position of the valve.

With this embodiment of the invention a ring 184 of a suitable sealing material such as rubber (made conductive) surrounds the inner component 176 when the outer component 178 is deposited so that this outer component will have the annular convolution 186. Thus within this convolution is situated a seal 184 which will maintain a fluid-tight coaction between the inner and outer components of the valve even if these components should become worn at their interface. It thus becomes possible to make these components of a relatively inexpensive material which need not be hardwearing.

In order to enhance the capacity for the assembly to respond to wear of the components so as to automatically take up this wear, a spring means is provided as indicated schematically in FIG. 17. This spring means 188 includes a ring 190 having an exterior thread and a cap 192 having an interior thread receiving the exterior thread of the ring 190. Within the cap 192 is situated a compressed coil spring 194. This spring presses against one side of the convolution 186 while the ring 190 presses against the other side thereof, and in this way the spring means 188 seeks to compress the resilient convolution 186. Therefore, with this construction any wear at the interface between the inner component 176 and outer component 178 will be automatically taken up and compensated by the spring means to provide for the valve of FIG. 17 a long operating life even though the parts are made of relatively inexpensive materials.

Figure 18:
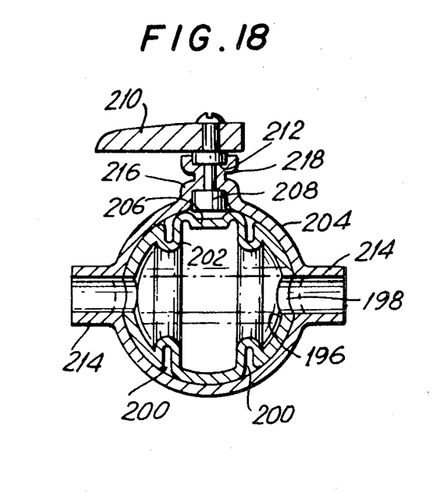
FIG. 18 is a schematic sectional elevation showing an additional wear-compensating structure as well as a structure which will reliably maintain a seal at a rotary valve stem.

With the above-described valves the inner component is in the form of a solid body. FIG. 18 shows an embodiment where the inner component 196 is hollow. This inner component 196 may itself be formed by electrolytic deposition on a wax body having a configuration conforming to that shown for the inner surface for the inner component 196. Thus, this wax body may have a pair of coaxial cylindrical projections which will form in the hollow body 196 the coaxial openings 198, and the wax body may be formed with coaxial circumferential grooves coaxial with each other and the coaxial cylindrical projections so as to provide for the body 196 the outwardly directed circumferential hollow grooves 200. In this way the body 196 which is made of a springy metal will have inwardly directed springy convolutions 202.

The outer component 204 is deposited directly on the inner component 196 in the manner described above in connection with FIG. 14. However, initially the grooves 200 are filled with wax. Moreover, the wax body on which the inner component was initially deposited was formed with a rectangular or square depression providing for the inner component 196 a rectangular or square part 206 which receives the non-circular inner end of a rotary stem 208 connected with the operating handle 210. This stem 208 is formed with an annular groove 212 which in any plane which contains the axis of the stem 208 is of a substantially rectangular or square cross section.

Thus, with the stem 208 joined with the hollow inner component 196, the outer component 204 is deposited, and after the structure has been completed it is possible by way of the handle 210 to turn the body 196 so that the grooves 200 respectively come into communication with the tubular extensions 214 enabling the wax to be melted out of the grooves 200. In this way the inner component 196 will have a tendency to expand, particularly in response to the pressure of a fluid in the interior of the inner component, to provide for the automatic taking up of any wear between the inner and outer valve components at their interface.

Moreover, the part 216 of the outer component, which surrounds the stem 208, has an inwardly directed portion 218 which is springy and which enters into the annular groove 212 of the stem 208. As a result of the springy nature of this inwardly directed annular convolution 218 of the stem-surrounding portion 216 of the outer component, an automatic seal will be provided at the stem 208 in response to any increase in pressure in the interior of the outer component 204.

Thus, the springy nature of the outer component will also act through the inwardly directed convolution 218 to achieve a perfectly fluid-tight seal at the rotary stem 208. The tightness of this seal will increase as the internal pressure increases, so that leakage at the stem is reliably avoided with this construction.

Figure 19:
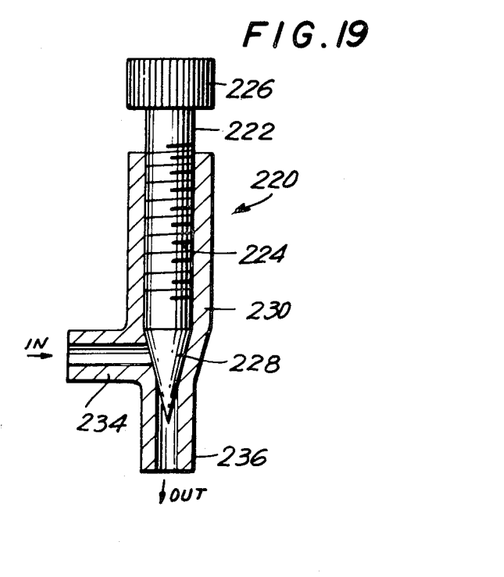
FIG. 19 is a schematic illustration of the manner in which the invention is applied to a needle valve.

FIG. 19 illustrates the application of the invention to a needle valve 220. This needle valve has an inner rotary component 222 provided with an exterior threaded surface 224 and having an operating handle 226. The rotary member 222 terminates in a tapered tip 228 as is conventional in such needle valves.

An outer component 230 is deposited directly on the inner component 222 in accordance with the method of the invention according to which molecular layers are deposited one directly upon the other to form an integrated outer component 230. However, as was described above in connection with FIGS. 11A–11C, the threads 224 are first lap-ground in the manner shown in FIGS. 11A and 11B and described above, so that a fit of previously unattainable precision is achieved between the outer component 230 and the inner component 222 at their complementary threaded surfaces. The outer component 230 is deposited in such a way that it has a tubular extension 232 forming an inlet and a tubular extension 234 forming an outlet for the needle valve 220. The needle valve is shown in its closed position in FIG. 19. The inner component 222 may be turned so as to displace the tapered tip 228 away from the inner surface of the outer component 230 which is situated between the extensions 234 and 236, and in this way the valve can be opened to a preselected extent.

Figure 20:
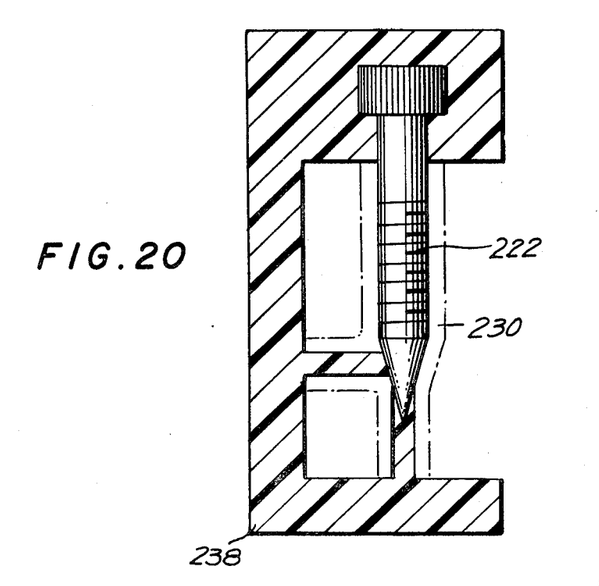
FIG. 20 is a schematic representation of a method used in the manufacture of the needle valve of FIG. 19.

The valve of FIG. 19, may, for example, be made in the manner shown schematically in FIG. 20. Thus, referring to FIG. 20 it will be seen that the inner component 222 is placed in engagement with a masking body 238 made of plastic, wax, or the like, so that it is not electrically conductive, and then the outer body 230 is electrolytically deposited directly on the inner body 222 in the manner indicated schematically in FIG. 20. Thereafter the wax masking body 238 is removed so that the structure shown in FIG. 19 will result.

In all of the embodiments described above the deposited component is deposited on the exterior of an inner component surrounding the latter, and in the specific examples referred to above electrolytic deposition of the molecular layers was referred to. However, it is equally possible to provide an inner deposited component which is deposited against an inner surface of a hollow outer component, and instead of electrolytic deposition it is possible to use catalytic deposition.

Figure 21:
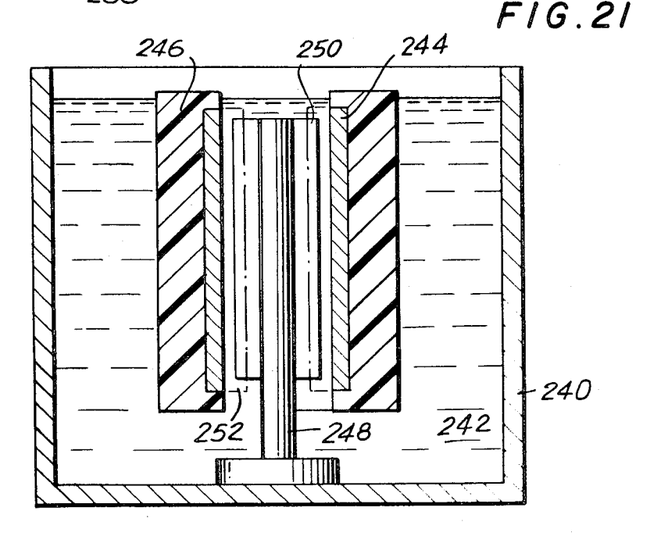
FIG. 21 is a schematic representation of another method of the invention.

Thus, referring to FIG. 21, there is shown a vat or other suitable container 240 which contains a solution for providing deposition by well-known autocatalytic procedures. The vat or other tank or container 240 may contain a solution 242 of electroless nickel, although it is possible if desired to provide a solution of any other metal which is to be catalytically deposited such as an electroless copper solution.

In the illustrated example the outer component 244 is shown, simply for illustrative purposes, as being in the form of a hollow cylinder which is surrounded at its ends and exterior surface by a suitable masking material 246. Before the component 244 is placed into the solution 242, it is dipped, with the masking body 246 thereon, into a solution of palladium chloride, so that, as is well-known, when the component 244 is subsequently placed in the solution 242, nickel will be deposited out of the electroless nickel solution onto the exposed inner surface of component 244 which has previously been dipped in the palladium chloride. Resting on the bottom of the container 240 is a pedestal which removably supports a stem 248 carrying axially extending and circumferentially distributed fins 250. As a result the metal which is catalytically deposited at the inner surface of the outer component 244 will surround the fins 250 so that upon removal of the structure from the solution 242 after an inner component of preselected thickness has been deposited, it will be possible to turn the stem 248 so as to rotate the inner component with respect to the outer component. Of course, the materials selected are such that they will not adhere so that where an electroless nickel or an electroless copper solution 242 is used the component 244 is made of stainless steel, for example. In this way it is possible to catalytically deposit against the inner surface of the outer component 244 an inner component 252, shown in dot-dash lines, and these components will also provide all of the outstanding advantages of the invention referred to above.

FIGS. 22–26 illustrate a method and article according to the invention for providing a faucet for home use with a single operating handle capable of being manipulated to provide both mixing of hot and cold water as well as to control the volume of liquid flow. The faucet 254 which is shown as it appears from exterior in FIG. 24, includes an elongated conduit 256 provided with a pair of bores 258 and 260 (FIG. 23) through which hot and cold water are adapted to flow by any well-known connections with the bores 258 and 260 of the conduit or pipe 256. The liquid is adapted to flow downwardly from an outlet spout 262 of the faucet, and it has an operating handle 264. This handle can be turned in the direction shown by the double-headed arrow 268 in FIG. 22 for opening and closing the faucet as well as for controlling the volume of flow. This turning to control the volume and to turn the faucet on or off takes place about an axis normal to the plane of FIG. 22 extending along a diameter of an inner hollow spherical component 270 of the valve structure of the faucet 254. The manually operable handle 264 is formed with a stepped bore 272 which receives a fastening screw 274 serving to fasten the operating handle 264 to a valve stem 276. Turning of the handle 264 about the axis of the stem 276 will control the mixing of hot and cold water, as will be apparent from the description which follows.

Figures 22, 23, 24, 25:
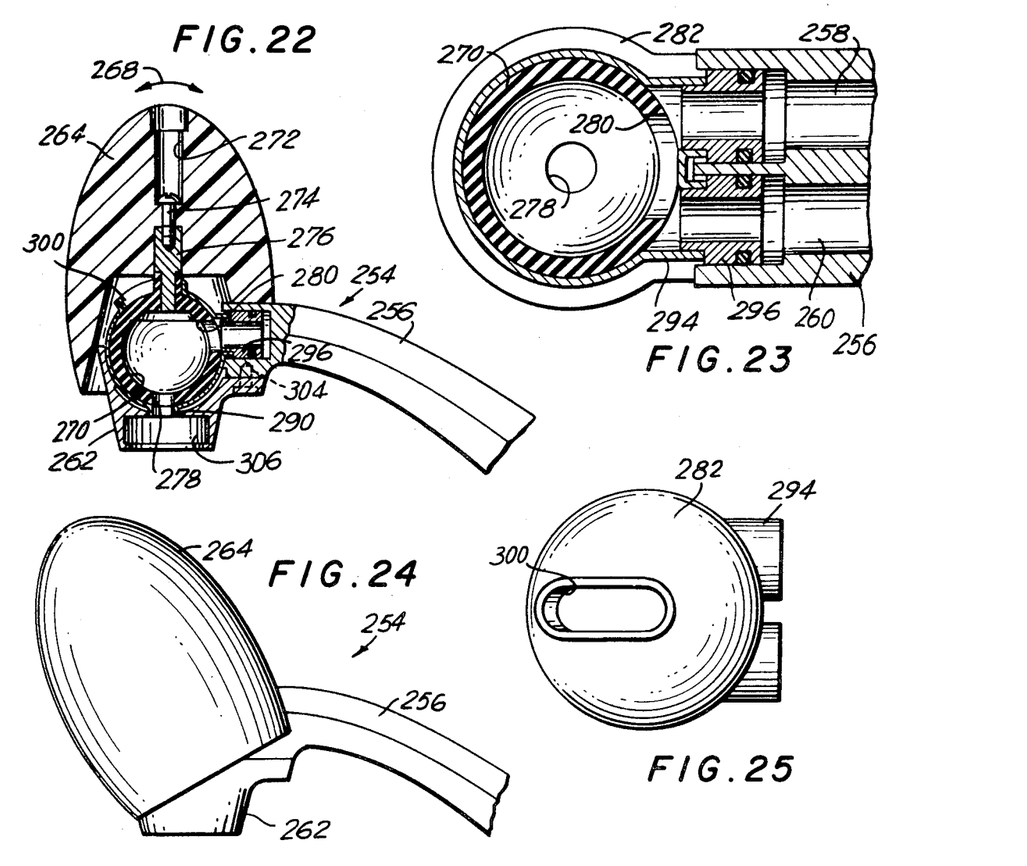
FIG. 22 is a sectional elevation of a faucet provided with a valve of the invention, manufactured according to the method of the invention.
FIG. 23 is a sectional plan view of the valve of FIG. 22.
FIG. 24 is a side elevation of the valve of FIGS. 22 and 23 as it appears from the exterior.
FIG. 25 is a top plan view illustrating the casing of the valve of FIGS. 22 and 23.

The inner component 270 of the valve of the faucet 254 is made of an elastomeric material such as a soft resilient rubber, for example. This inner hollow component 270 may be inexpensively manufactured according to well-known injection molding techniques, for example. The hollow elastomeric component 270 is molded directly onto the stem 276 so as to be fixed to the latter for turning movement therewith. Moreover, it is formed with a bottom opening 278 and between the opening 278 and the stem 276 with a rear opening 280.

Figure 26:
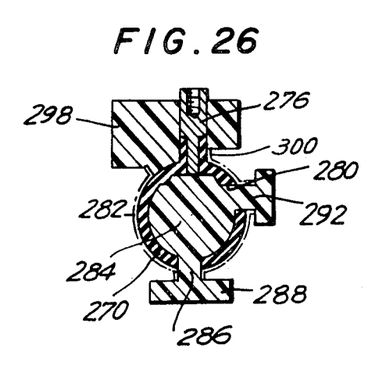
FIG. 26 is a schematic representation of a method used in the manufacture of the valve of FIGS. 22–25.

In accordance with the techniques of the invention described above, an outer valve casing 282 is deposited directly on the inner hollow component 270. This inner component 270 is initially filled with wax 284, as shown in FIG. 26, so that it will not collapse during deposition of the outer component 282 thereon. The wax filler 284 has a lower cylindrical extension 286 terminating in a flange 288 so as to provide for the deposited component 282 a lower cylindrical outlet 290 received in the outlet component 262 of the faucet as indicated in FIG. 22. Moreover, the wax filler 284 has a pair of cylindrical parallel extensions 292 extending rearwardly through the opening 280 so that the deposited outer components 282 will have a pair of parallel tubular extensions 294. Thus, the wax completely fills the opening 280 and has the cylindrical extensions 292 which form for the outer component 282 the pair of parallel tubular extensions 294. These extensions 294 are respectively fluid-tightly connected in a well-known manner with nipples or other fittings 296 which respectively communicate with the passages 258 and 260 as shown in FIG. 23.

The exterior surface of the component 270 is rendered electrically conductive, as by being provided with a coating of graphite, and then the component 282 which may be made of copper, for example, is electrolytically deposited on the exterior of the hollow wax-filled component 270. Then the wax is removed. At its upper portion, on one side of the tubular part of component 270 which is directly molded onto the stem 276, a masking body 298 is provided surrounding the stem 276 and having an extension 300 which will provide for the deposited body 282 the elongated endless flange 302 as shown most clearly in FIG. 25. Thus, the stem 276 and the part of the inner component which is molded thereon can move back and forth along the interior space of the elongated endless flange 302 which is deposited around the wax portion 300 situated at the exterior of component 270 in the manner shown in FIG. 26.

After the component 282 has thus been deposited, all of the wax is removed. The tubular extensions 294 are then connected to the nipples 296 in the manner shown in FIG. 23. The bottom part 262 is fastened with the pipe 256 as by way of screws 304 so that the tubular outlet 290 of the outer component 282 is in alignment with a downwardly directed hollow outlet 306 of the component 262. The handle 264 is then fastened to the stem 276 by way of the screw 274 and now the faucet is completed.

It is to be noted that this faucet of the invention is relatively inexpensive because of the low cost of the components used in the manufacture thereof. Moreover, it is capable of achieving a perfect seal reliably preventing any possibility of leakage. The reason for this is that the elongated rear opening 280 is made of such a size that it is always in communication with one or the other or both of the tubular passages 258 and 260, so that the hollow interior of the elastomeric inner component 270 is always in communication with a liquid which is under pressure. Even when the valve stem is turned to that end of the flange 302 where the opening 278 is completely out of communication with the cylindrical extension 290 of the outer component, so that the valve is completely cut off, the opening 280 will communicate with the liquid supplied through the passages 258 and 260. The result is that this liquid under pressure is at all times located within the hollow interior of the inner component 270 and presses the latter against the inner surface of the outer component 282. Because of the resilient flexible nature of the inner component 270, the pressure of the inner liquid will assure a perfect seal at the interface between the inner component 270 and the outer component 282, so that the pressure of the liquid itself is used to achieve a perfect seal with this faucet 254 of the present invention. Moreover, it will be noted that because of this type of operation any wear between the inner and outer components will automatically be taken up and compensated by the yieldability of the inner elastomeric component 270 and the pressure of the liquid in the hollow interior thereof. In this way it is possible to achieve with the invention an inexpensive faucet which cannot leak while at the same time providing both mixing and volume control with the single operating handle 264.

As is apparent from the above description, the basic principles of the present invention have an extremely wide variety of applications. With the present invention it becomes possible to achieve between components which move one with respect to the other a fit of a precision which heretofore could not be achieved, particularly at the relatively low cost with which such fit is achieved with the present invention.

It is apparent from the above description that the method of the invention involves depositing of a metal in situ and under conditions where the deposited material does not even have a metallic form until it is deposited.

In other words, with the method of the invention a nascent metal, which does not assume a metallic form until deposited, is deposited in nascent state in situ on a surface to which it does not adhere.

In the above description reference has been made to disposition of metals such as nickel or copper on stainless steel or plastic bodies which are rendered conductive. However, the invention can be used with many different materials some of which can be passivated by first dipping in suitable parting compounds. Thus in the list which follows the body which receives the deposited material is referred to as a master mandrel or fabricated form, and the preferred parting compound, where required, is set forth. With all of these bodies it is possible to deposit any metal which can be electrolytically deposited for example. Therefore, a list of deposited metals is not set forth since as long as any metal can be electrolytically deposited, it can be deposited on any of the bodies set forth in the list which follows.

| Master Mandrel or Fabricated Form | Preferred Parting Compound |
|---|---|
| Aluminum or Aluminum Alloys | Chromate Solution 0.25–2.5 oz/gal |
| Beryllium or Beryllium Alloys | Chromate Solution 0.25–2.5 oz/gal |
| do | |
| Cadmium or Cadmium Alloys | Chromate Solution 0.25–2.5 oz/gal |
| Chromium or Chromic Alloys | No parting compound needed |
| Cobalt or Cobalt Alloys | Chromate, Borate or Oxalate Solutions 0.25–2.5 oz/gal |
| Copper or Copper Alloys | Chromate Solution 0–25–2.5 oz/gal |
| Gold or Gold Alloys | Chromate Solutions, silicones or quaternary amines |
| Iron or Iron Alloys | Silicones, quaternary amines or chromate solutions; non-magnetic stainless steels require no parting compound. |
| Lead or Lead Alloys | Chromate solution 0.25–2.5 oz/gal |
| Magnesium or Magnesium Alloys | Chromate solution 0.25–2.5 oz/gal |
| Nickel or Nickel Alloys | Chromate, Borate or Oxalate Solutions 0.25–2.5 oz/gal |
| Silver or Silver Alloys | Chromate or Sulfide Solutions 0.25. oz/gal |
| Tantalum or Tantalum Alloys | No parting compound needed |
| Tin or Tin Alloys | Chromate Solutions 0.25.25 oz/gal |
| Titanium or Titanium Alloys | No parting compound needed |
| Tungsten or Tungsten Alloys | No parting compound needed |
| Zinc or Zinc Alloys | Chromate Solutions 0.25–2.5 oz/gal |
| Zirconium or Zirconium Alloys | No parting compound needed |

The materials where no parting compound is required have a natural oxide film and with proper cleaning and pretreatment, they will not normally accept an adherent plate.

What is claimed is:

1. In an assembly of at least two components at least one of which is movable relative to the other, comprising an inner component and an outer component surrounding said inner component, said inner and outer components respectively having outer and inner complementary surfaces located adjacent and directed toward each other, and one of said components being composed of a series of deposited integrated molecular layers deposited on and having a configuration determined by the other of said components without adhering thereto with that one of said layers which is first deposited forming the complementary surface of said one component, said other component having a configuration capable of maintaining a layer deposited thereon assembled therewith while movable with respect thereto, so that said components are maintained in their assembled condition and are movable one with respect to the other after said one component is deposited on said other component, said inner component being a valve body and said outer component forming said one component composed of said integrated molecular layers and having its inner complementary surface fluid-tightly engaging the outer complementary surface of said inner valve body.

2. The combination of claim 1 and wherein said inner component is of a substantially cylindrical configuration and is formed with a transverse through-flow bore.

3. The combination of claim 1 and wherein a valve stem is operatively connected with and extends from said inner body, said stem being formed with an annular groove, and said outer body having a tubular portion surrounding said stem and a springy portion extending into said groove for responding to pressure to provide a seal at said groove.

4. The combination of claim 1 and wherein said outer body is formed with a groove surrounding said inner body and a sealing ring situated in said groove.

5. The combination of claim 1 and wherein said inner body is of a substantially spherical configuration formed with a fluid passage.

6. The combination of claim 5 and wherein said inner body is in the form of a solid sphere in which the fluid passage is formed.

7. The combination of claim 6 and wherein said fluid passage is a diametrical bore extending through and containing a diametric axis of said spherical body.

8. The combination of claim 5 and wherein said inner body is in the form of a solid member and said fluid passage including a fluid outlet and a pair of fluid inlets for hot and cold water, respectively, said outer component supporting said inner valve body for swinging movement about a pair of mutually perpendicular axes for providing both mixing and volume control.

9. The combination of claim 8 and wherein said body is hollow and made of an elastomeric material and said fluid inlets communicating with liquid under pressure even when the body is in a shut-off position, so that the fluid under pressure then enters into the interior of said body to press the latter fluid-tightly against the inner surface of said outer component.

10. In an assembly of at least two components at least one of which is movable relative to the other, comprising an inner component and an outer component surrounding said inner component, said inner and outer components respectively having outer and inner complementary surfaces located adjacent and directed toward each other, and one of said components being composed of a series of integrated molecular layers one of which forms the complementary surface of said one component, said inner component being a valve body and said outer component forming said one component composed of said integrated molecular layers and having its inner complementary surface fluid-tightly engaging the outer complementary surface of said inner valve body, said outer component having elongated tubular portions through which fluid is adapted to flow, and said elongated tubular portions having springy convolutions providing for a resilient mounting of said outer component.

11. In an assembly of at least two components at least one of which is movable relative to the other, comprising an inner component and an outer component surrounding said inner component, said inner and outer components respectively having outer and inner complementary surfaces located adjacent and directed toward each other, and one of said components being composed of a series of integrated molecular layers one of which forms the complementary surface of said one component, said inner component being a valve body and said outer component forming said one component composed of said integrated molecular layers and having its inner complementary surface fluid-tightly engaging the outer complementary surface of said inner valve body, said outer component having an annular hollow convolution which is springy, and spring means coacting with said convolution for urging the latter to assume a smaller size, so that said spring means acts through said convolution to take up wear between said components.

12. In an assembly of at least two components at least one of which is movable relative to the other, comprising an inner component and an outer component surrounding said inner component, said inner and outer components respectively having outer and inner complementary surfaces located adjacent and directed toward each other, and one of said components being composed of a series of integrated molecular layers one of which forms the complementary surface of said one component, said inner component being a valve body and said outer component forming said one component composed of said integrated molecular layers and having its inner complementary surface fluid-tightly engaging the outer complementary surface of said inner valve body, said inner body being formed with convolutions having hollow outwardly directed exteriors and said inner body being hollow and made of a springy material so that at said convolutions it will freely tend to expand into engagement with the inner surface of said outer component.

* * * * *